United States Patent [19]

Uchiyama et al.

[11] Patent Number: 5,136,325
[45] Date of Patent: Aug. 4, 1992

[54] PHOTOMETRIC APPARATUS

[75] Inventors: Shigeyuki Uchiyama, Tokyo; Ken Utagawa, Yokohama, both of Japan

[73] Assignee: Nikon Corporation, Tokyo, Japan

[21] Appl. No.: 808,973

[22] Filed: Dec. 17, 1991

Related U.S. Application Data

[63] Continuation of Ser. No. 551,209, Jul. 11, 1990, abandoned.

[30] Foreign Application Priority Data

Jul. 13, 1989 [JP] Japan ................................. 1-181341
Dec. 21, 1989 [JP] Japan ................................. 1-331870

[51] Int. Cl.$^5$ ............................................. G03B 13/00
[52] U.S. Cl. ..................................... 354/402; 354/432
[58] Field of Search ............................ 354/400–409, 354/429, 430, 432

[56] References Cited

U.S. PATENT DOCUMENTS 4,476,383 10/1984 Fukuhara et al. ................. 250/214
4,561,749 12/1985 Utagawa ........................... 354/406

*Primary Examiner*—L. T. Hix
*Assistant Examiner*—David M. Gray
*Attorney, Agent, or Firm*—Shapiro and Shapiro

[57] ABSTRACT

In photometric apparatus, averaged brightness information, which counteracts the deleterious effects of a varying light source, such as a fluorescent lamp, is obtained much more rapidly than averaged brightness information obtained after a substantial number of cycles of operation of a storage type image sensor normally used for photometry. Use is made of brightness information obtained from a photoelectric conversion device of the type normally used for focus detection. Photoelectric conversion signals obtained from the photoelectric conversion device are averaged, and image sensor brightness information obtained from the image sensor after only one cycle of image sensor operation is corrected in accordance with the photoelectric conversion brightness information and the averaged photoelectric conversion brightness information, so as to make the image sensor brightness information correspond to averaged image sensor brightness information obtained by averaging the image sensor signals over a plurality of image sensor operation cycles.

13 Claims, 11 Drawing Sheets

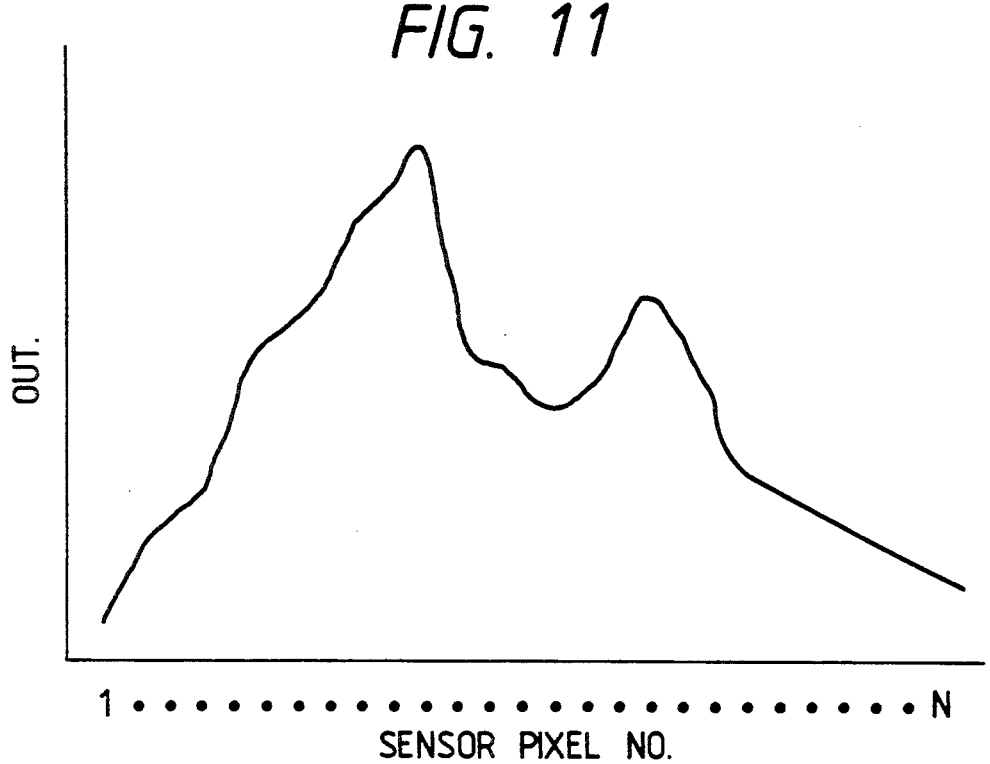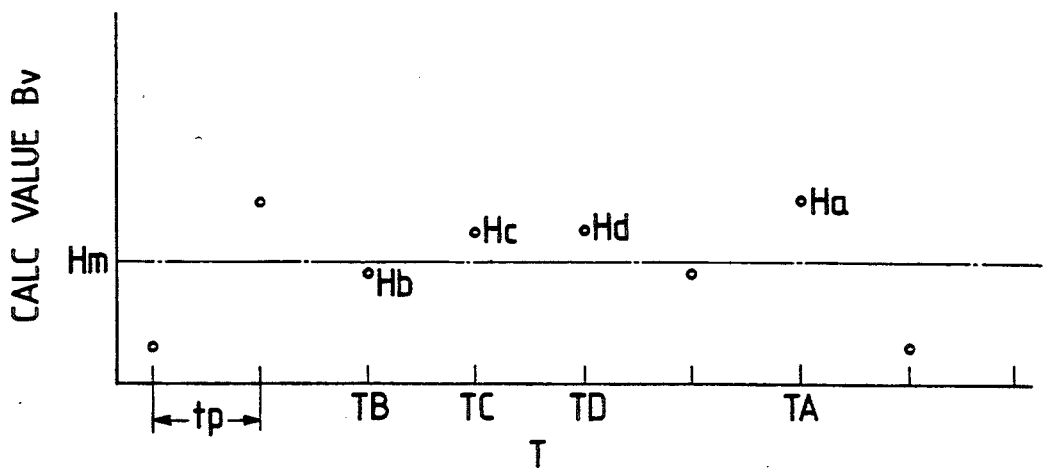

PHOTOMETRIC APPARATUS

This is a continuation of application Ser. No. 551,209 filed Jul. 11, 1990 (now abandoned).

BACKGROUND OF THE INVENTION

1. Field of the Invention

The present invention relates to a photometric apparatus for use in a camera and capable of obtaining brightness information, and, more particularly, to a photometric apparatus, arranged to obtain brightness information from an output from an image sensor for use in detecting a focal point.

2. Related Background Art

The photometry of a camera is performed by a variety of methods, for example, by an average photometry in which the overall frame to be photographed is subjected to photometry, a central weighted photometry in which the central portion of the frame is in main subjected to the photometry and a spot photometry in which a very narrow portion at the central portion of the frame is subjected to the photometry.

Recently, auto-focusing has been realized in cameras, the auto-focusing being realized by converting beams at the central portion of the frame to be photographed into an electric signal by an image sensor array consisting of a plurality of photo-sensor pixels so that the focal detection is conducted in response to the thus formed electric signal. A structure capable of performing the spot photometry has been known, the structure being arranged in such a manner that the electric signal generated by the image sensor array is also used as brightness information.

However, the image sensor array for detecting the focal point is of a charge stored type such as a CCD image sensor. Therefore, the following problem arises:

In general, in a photometric apparatus, the charge generated by a photo-diode is received in the form of the value of an electric current. Therefore, brightness information at a certain time can be instantaneously obtained. Therefore, the light source which is illuminating a subject prevents change in brightness information in a case where the brightness of the light source for illuminating the subject is cyclically changed. Therefore, even if the structure is arranged in such a manner that brightness information for several times is averaged, the processing can be completed in a short time.

However, if the charge stored type image sensor such as a CCD image sensor is used for detecting the focal point, the time for storing the charge, that is, the storage time and transfer time for transmitting the outputs from a plurality of photo-sensors by a shift register in a time sequential manner must be taken in order to obtain an output signal from the sensor. Therefore, when the structure is arranged in such a manner that the brightness information for several times is averaged for the purpose of preventing the change in the brightness information due to light having cyclic characteristics such as a fluorescent lamp, an excessively long time is required.

SUMMARY OF THE INVENTION

An object of the present invention is to provide a photometric apparatus capable of immediately obtaining brightness information which corresponds to the averaged value of brightness information for several times, the brightness information being obtained from a signal obtained from one storage operation performed by a storage type image sensor.

Another object of the present invention is to provide a camera arranged in such a manner that the exposure is controlled in response to signals supplied from a photoelectric conversion device and an image sensor.

According to the present invention, there is provided a photometric apparatus having a photometric photoelectric conversion device and a storage type image sensor for detecting a focal point or multipattern photometry, comprising: first photometric operation means for receipt a light receiving signal of the photometric photoelectric conversion device at a predetermined cycle and calculating brightness information; second photometric operation means for calculating averaged brightness information from which change due to a cyclic light source has been eliminated in accordance with the averaged value of the light receipt signals for a plurality of cycles supplied from the photoelectric conversion device to the first photometric operation means; third photometric operation means for receiving signals obtained whenever one storage operation of the image sensor is ended and calculating brightness information; and correction means for correcting brightness information calculated by the third photometric operation means to brightness information which corresponds to the averaged value of brightness information obtained by performing the storage in the image sensor by a plurality of times in accordance with the brightness information calculated by the first and the third photometric operation means.

The correction performed by the correction means is arranged in such a manner that the difference between the averaged photoelectric information calculated by the second operation means and the brightness information calculated by the first operation means at substantially the same time at which one storage of the image sensor is ended, is added to the brightness information calculated by the third operation means in the case where the time in which the storage in the image sensor is shorter than a cycle for calculating brightness information performed by the first operation means.

The correction is arranged in such a manner that the difference between the averaged brightness information calculated by the second operation means and the average value of the brightness information which has been calculated by a plurality of times by the first operation means during one storage operation by the image sensor is added to the brightness information calculated by the third operation means in the case where the time in which the storage in the image sensor is longer than a cycle for calculating brightness information performed by the first operation means.

In the photometric apparatus according to the present invention thus constituted, brightness information is calculated at predetermined cycle from the signal from the conventional photometric photoelectric conversion device which performs the central weighted photometry and the average value of the plurality of brightness information thus calculated is obtained. As a result, the averaged brightness information for a subject which is being illuminated by a light source the brightness of which is cyclically changed is obtained.

On the other hand, brightness information is calculated from the signal obtained from one storage of the focal-point detecting storage type image sensor. The brightness information obtained from the image sensor is corrected by brightness information and the averaged brightness information from the photometric photoelectric conversion device. Therefore, the averaged brightness can be immediately estimated by calculating brightness information obtained by a plurality of storages in the image sensor.

Other and further objects, features and advantages of the invention will be appear more fully from the following description.

BRIEF DESCRIPTION OF THE DRAWINGS

FIG. 11 illustrates an output from the image sensor array;

FIG. 13 illustrates an output timing of brightness value Bv calculated from the output from the photometric module AE;

DESCRIPTION OF THE PREFERRED EMBODIMENTS

Preferred embodiments of the present invention will now be described in detail with reference to the drawings.

Figure 1:
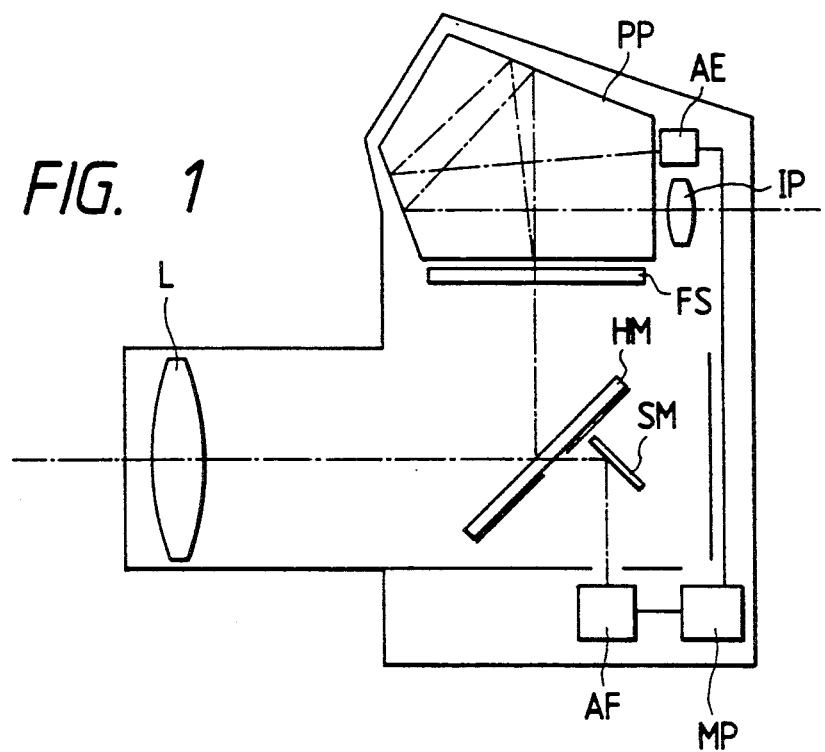
FIG. 1 is an overall view which illustrates a camera having a device according to the present invention.

FIG. 1 illustrates the overall structure of a camera having a photometric apparatus according to the present invention.

Referring to FIG. 1, a symbol L represents an objective lens, HM represents a half mirror, SM represents a sub-mirror, FS represents a focusing screen, PP represents a penta prism and IP represents an ocular. AE represents a photometric module having a photoelectric transferring device, AF represents a focal-point detecting module having a CCD (Charge Coupled Device) image sensor and MP represents a microprocessor.

A portion of beams, which have passed through the objective lens L and reflected by the half mirror HM, is imaged on the focusing screen FS so that a photographer observes the image thus formed in the form of an erected image via the ocular IP. The photometric module AE transmits a signal, which denotes that the image has been formed on the focusing screen FS, to the microprocessor MP so that brightness information is calculated by the microprocessor MP.

A portion of the beams, which have passed through the half mirror HM, in the vicinity of the optical axis of the objective lens L is introduced into the focal-point detecting module AF by the sub-mirror SM. The focal-point detecting module AF includes an image sensor array to be described later so as to convert the beam made incident upon the focal-point detecting module AF into an electric signal and supply the electric signal thus formed to the microprocessor. The microprocessor MP detects how well the focal point of the objective lens L is adjusted (the quantity of defocus). The microprocessor MP as well calculates brightness information on a very-small space in the central portion of the photographed frame.

Now the structure of an image sensor chip 3 for use in a focal-point detecting module AF will be described with reference to FIG. 2.

Figure 2:
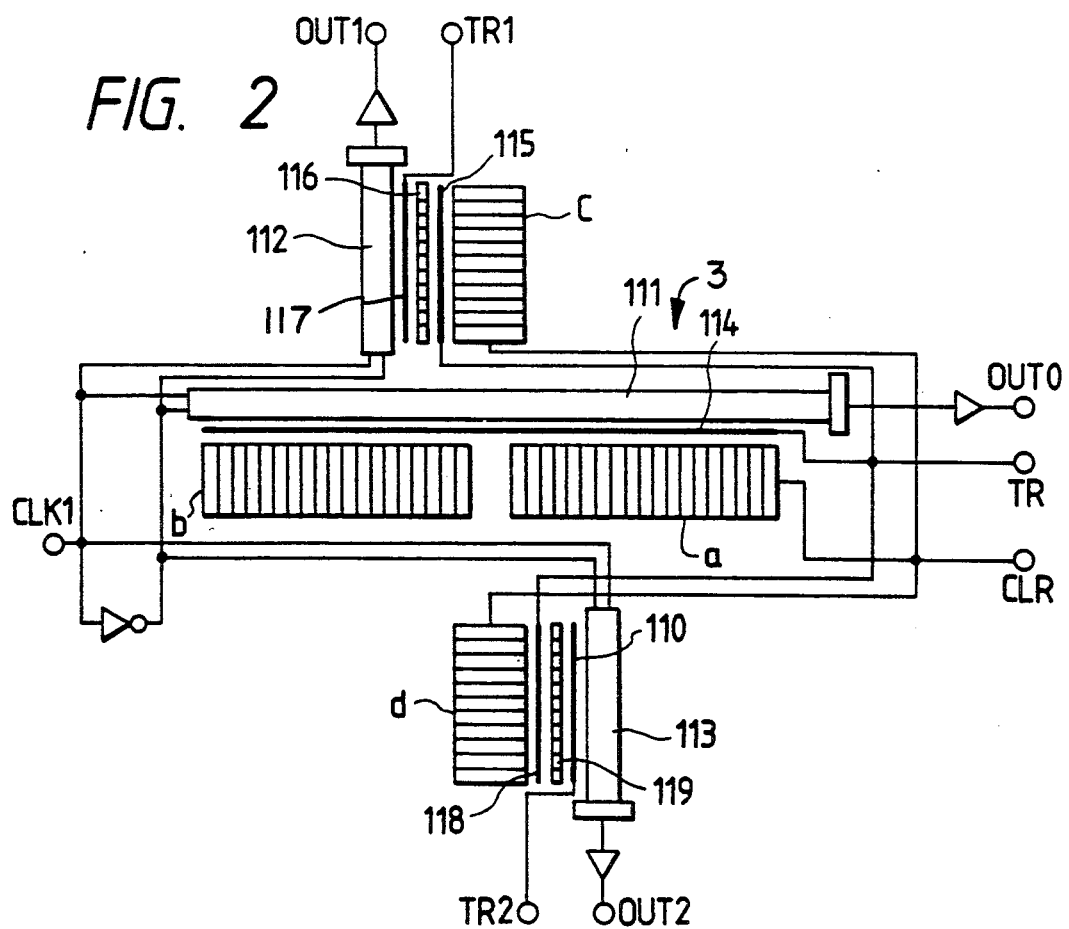
FIG. 2 illustrates an image sensor chip.

As shown in FIG. 2, the image sensor chip 3 comprises: a pair of image sensor arrays a and b each of which consists of a plurality of sensor pixels laterally arranged; and a pair of image sensor arrays c and d arranged perpendicularly to the pair of image sensor arrays a and b. Therefore, the focal point of a subject such as a horizontal line having contrast in only the horizontal direction can be detected by the image sensors c and d.

First, second and third shift registers 111, 112 and 113 are disposed in parallel to the image sensor arrays a, b, c and d so as to transmit signals from the image sensor arrays a, b, c and d through output terminals OUT0, OUT1 and OUT2. Memory portions 116 and 119 are disposed between the image sensor arrays c and d and the shift registers 112 and 113, the memory portions 116 and 119 temporarily saving charge signals corresponding to each of the photosensors and supplied from the image sensor arrays c and d so as to supply the charge signals thus temporarily stored to the next shift registers 112 and 113 after a lapse of a predetermined time period. A shift gate 114 transfers the charge signal stored in each of the photosensors of the image sensor arrays a and b to the shift register 111. Shift gates 115 and 118 transfer the charge signal stored in each of the photosensors of the image sensor arrays c and d to the memory portions 116 and 119. Transfer gates 117 and 110 disposed between the memory portions 116 and 119 and the shift registers 112 and 113 are provided for the purpose of transferring the charge signal stored in each of memory devices of the memory portions to the shift registers 112 and 113. An input terminal CLR is connected to all of the image sensor arrays a, b, c and d so that the charge corresponding to light made incident upon each of the photosensors is charged during only the time in which a digital signal "L" is being supplied. An input terminal CLK1 is connected to all of the shift registers for the purpose of successively transferring the output charge from each of the image sensor arrays a, b, c and d to the shift registers 111, 112 and 113 in response to the transfer pulse.

Now a focal-point detecting optical system for use in the focal-point detecting module AF will be described with reference to FIGS. 3A and 3B.

Figure 3A:
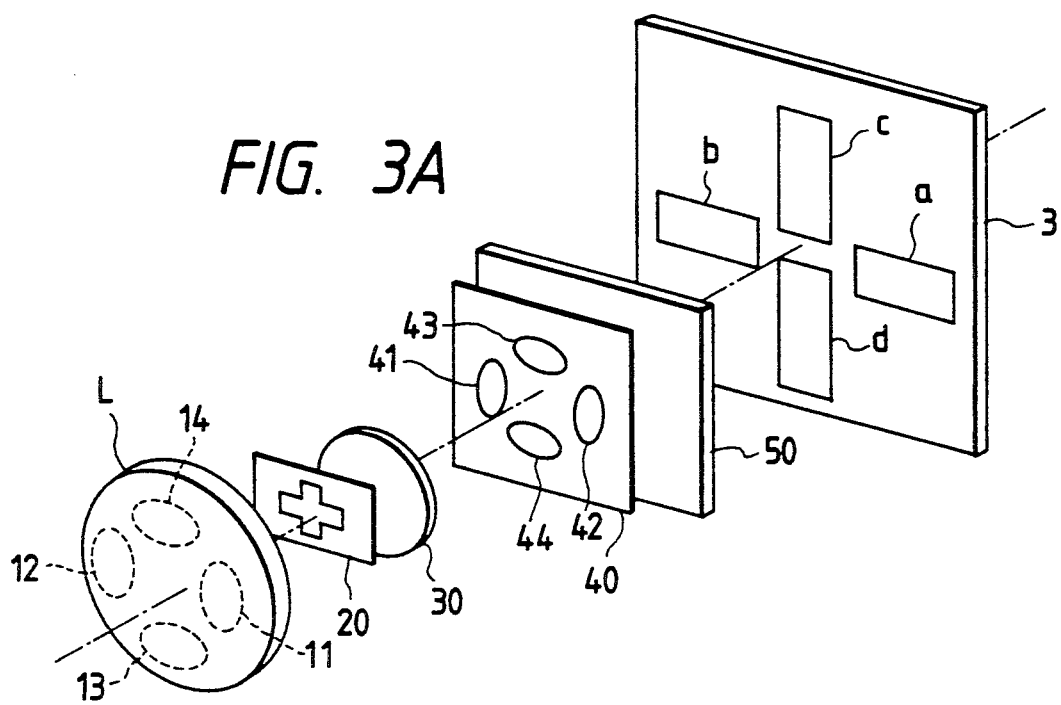
FIGS. 3A and 3B illustrate a focal-point detecting optical system.
Figure 3B:
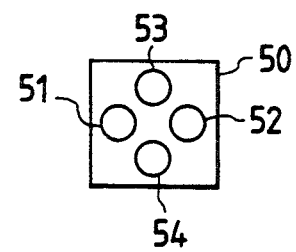

The focal-point detecting optical system is constituted by an eye-field mask 20, a field lens 30, a diaphragm 40, a re-imaging lens 50 and an image sensor chip 3 arranged successively as shown in FIG. 3A. The eye-field mask 20 has a cross-shaped opening therein, the eye-field mask 20 being disposed in the vicinity of a predetermined focal plane for the objective lens L so as to restrict the aerial image formed by the objective lens L. The diaphragm 40 has four openings 41, 42, 43 and 44 which are projected as 11, 12, 13 and 14 on the objective lens L by the field lens 30. As shown in FIG. 3B, the re-imaging lens 50 comprise four lenses 51, 52, 53 and 54 which correspond to the openings 41, 42, 43 and 44 so that the image of the eye-field mask 20 is formed on the image sensor chip 3. Therefore, the beams made incident from the region 11 of the objective lens L are imaged on the image sensor array a after they have passed through the eye-field mask 20, the field lens 30, the opening 41 of the diaphragm 40, and the lens 51 of the re-imaging lens. Similarly, the beams made incident upon the regions 12, 13.and 14 of the objective lens L are respectively imaged on the image sensor arrays b, c and d. The images of a subject imaged on the image sensor arrays a and b move away from each other when the objective lens L is in a front-focus state, while the same are brought close to each other when the objective lens is in a rear-focus state. Furthermore, when the objective lens L is in focus, the images are positioned in line at a certain distance. Therefore, the focus state of the objective lens L in the horizontal direction can be arrays a and b.

Similarly, the images of a subject imaged on the image sensor arrays c and d move away from each other when the objective lens L is in a front-focus state, while the same are brought close to each other when the objective lens L is in a rear-focus state. Furthermore, when the objective lens L is in focus, the images are positioned in line at a certain distance. Therefore, the focus state how well the focal point of the objective lens L in the vertical direction can be detected by calculating the signals from the image sensor arrays c and d.

The photometric module AE will be described with reference to FIGS. 4A and 4B.

Figure 4A:
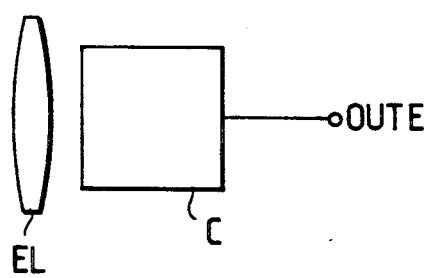
FIGS. 4A and 4B illustrate a photometric module AE.
Figure 4B:
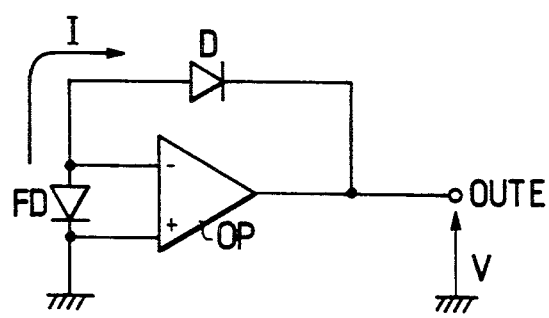

As shown in FIG. 4A, the photometric module AE comprises a lens EL and a circuit C. The lens EL acts to determine the region of the image on a finder screen FS from which brightness information is obtained. The circuit C comprises, for example, a photodiode FD, a diode D and an operational amplifier OP. As a result of the structure thus formed, a logarithmic compression function is realized so that electric current I generated in the photodiode FD is transmitted as voltage V which is in proportion to Log (I) to an output terminal OUTE by the diode D and the operational amplifier OP. The reason why the electric current is logarithmically compressed lies in that the brightness of the photographed subject has a very wide dynamic range and that because the.brightness of a subject is, in an APEX method which is an ordinary method for obtaining the exposure, expressed by value Bv which has been subjected to a logarithmic processing, the calculation can be simplified if data, which has been logarithmically compressed, is supplied.

Now the connections among the above-described focal-point detecting module AF, the photometric module AE and the microprocessor MP will be described with reference to FIG. 5.

Figure 5:
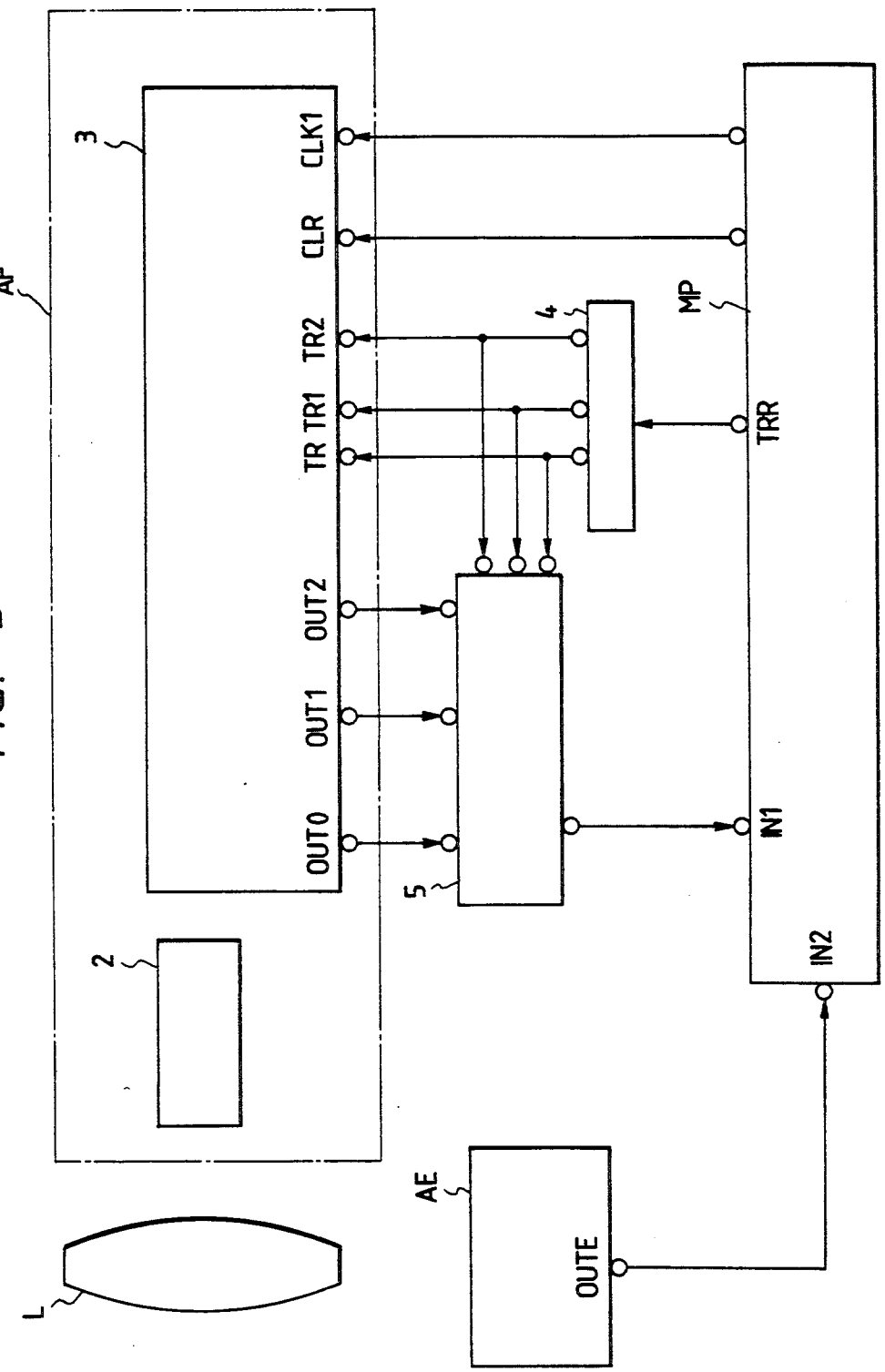
FIG. 5 illustrates the connection among a focal-point detecting module AF, a first photometric module AE and a microprocessor.

Referring to FIG. 5, reference numeral 3 represents the image sensor chip shown in FIG. 2.

Reference numeral 2 represents the focal-point detecting optical system shown in FIG. 3A. Reference numerals 4 and 5 represent a first control portion and a second control portion for controlling the signal supplied to and from the image sensor chip 3 and the microprocessor MP.

The image sensor chip 3 has input terminals TR, TR1, TR2, CLR and CLK1 and output terminals OUT0, OUT1 and OUT2. The output terminals OUT0, OUT1 and OUT2 are connected to the second control portion 5, while the terminals CLR and CLK1 are connected to the microprocessor MP. Furthermore, the input terminal TR, TR2 and TR1 are connected to the first control portion 4. Signals transmitted from the first control portion 4 to the input terminals TR, TR1 and TR2 are also transmitted to the second control portion 5. An output terminal TRR of the microprocessor MP is connected to the first control portion 4, while an input terminal INI is connected to the second control portion 5. Furthermore, an input terminal IN2 of the same receives the above-described voltage V as the brightness signal from the first photometric module AE.

The first control portion 4 generates trigger pulses of the digital signals at the terminals TR, TR1 and TR2 in response to the signal supplied through the output terminal TRR of the microprocessor MP. The trigger pulses supplied to the terminal TR simultaneously act on shift gates 114, 115 and 118 so that the charge signals stored in the image sensor arrays a, b, c and d are transferred. The trigger pulses supplied to the terminals TR1 and TR2 act on the transfer gates 117 and 110 at different timing so that the charges stored in the memory portions 116 and 119 are transferred.

Figure 6:
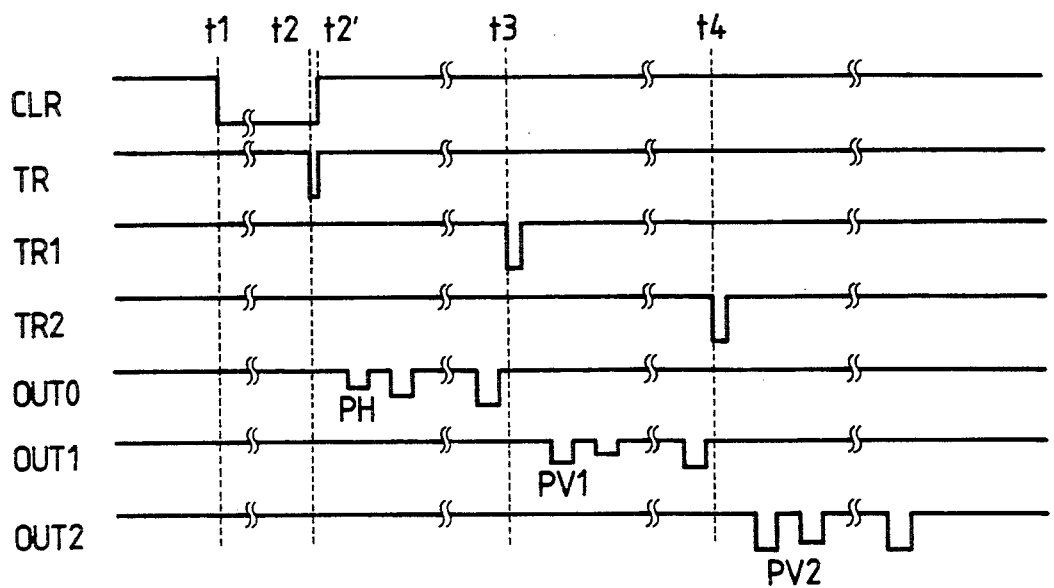
FIG. 6 illustrates the timing of the operation of the image sensor chip.

The operation of the image sensor chip 3 will be described with reference to a timing chart shown in FIG. 6.

The image sensor arrays a, b, c and d simultaneously start the storages at time t1 at which the digital signal supplied to the input terminal CLR becomes "L". When pulses are supplied from the first control portion 4 to the shift gate 114 via the terminal TR at time t2, the charge signals at the image 111 so as to be transferred concurrently to the transferring pulses. As a result, the charge signals are, as time sequential signal outputs, transmitted from the output portion OUT0 as designated by symbol PH. At the time t2, the charge signals of the memory portions 116 and 119 via the shift gates 115 and 118. In this state, the time in which the charge signals are stored can be expressed by t2 - t1.

The first control portion 4 supplies pulses to the terminal TR1 at time t3 at which the transfer of the charges of the image sensor arrays a and b by the shift register 111 is ended. As a result, the charge signals of the image sensor array c stored in the memory portion 116 are transferred to the shift register 112 so as to be successively transmitted as time sequential signal outputs PV1 from the output portion OUT1.

Furthermore, the first control portion 4 supplies pulses to the terminal TR2 at time t4 after the transfer concerned with the image sensor array c has been completed. As a result, the charge signals of the.image sensor array d stored in the memory portion 119 are transferred to the shift register 113 so as to be successively transmitted as time sequential signal outputs PV2 from the output portion OUT2.

When the image sensor array chip thus structured is used, the charge signals transmitted in parallel from the image sensor arrays a, b, c and d can be transmitted in the form of time sequential signals from the output terminals OUT0, OUT1 and OUT2 without a time overlap.

Figure 7A:
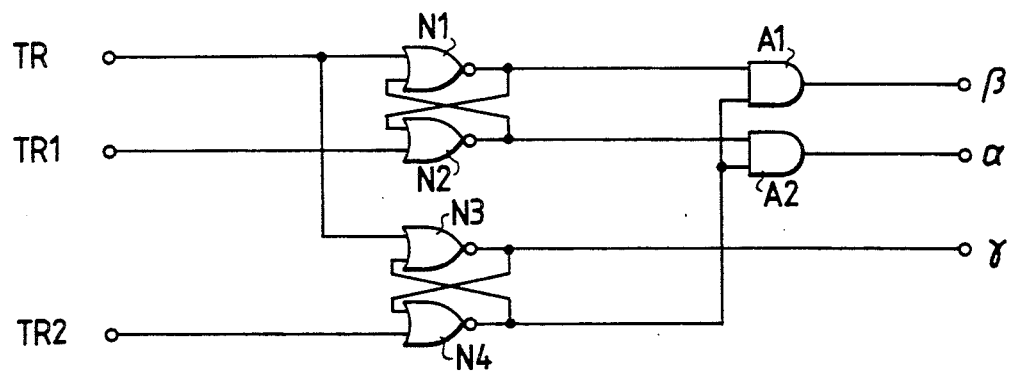
FIGS. 7A and 7B illustrate a second control portion.
Figure 7B:
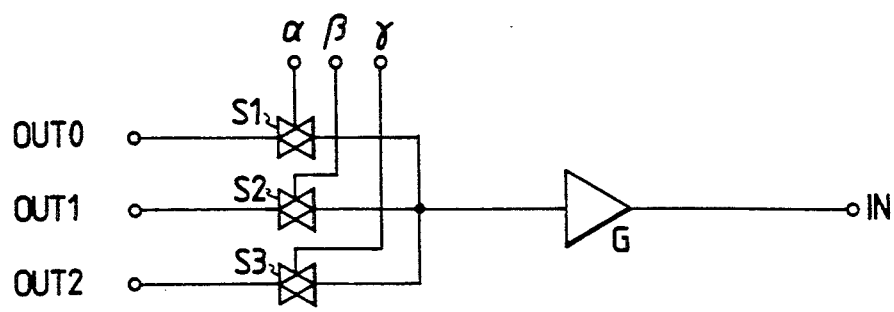

Now the structure of the second control portion 5 will be described with reference to FIGS. 7A and 7B.

The second control portion 5 acts to selectively correct the three output lines OUT0, OUT1 and OUT2 of the image sensor array chip 3 to the input terminal IN1 of the microprocessor MP. The output terminals OUT0, OUT1 and OUT2 are connected to switches S1, S2 and S3 shown in FIG. 7B, the switches S1, S2 and S3 being switched on/off in response to signals supplied to control terminals a, B, y. The output terminals of the respective switches S1, S2 and S3 are collectively inputted to an amplifier G. FIG. 7A shows a circuit for controlling signals to be supplied to the control terminals a, B, y of the switches S1, S2 and S3 by transmitting the signals from the first control portion 4 to the terminals TR, TR1 and TR2 of the image sensor array chip 3. That control circuit comprises NOR gates N1, N2, N3 and N4 and AND gates A1 and A2.

The operation will be described.

When pulses are supplied from the first control portion 4 to the terminal TR for the purpose of ending the storage of the image sensor arrays a, b, c and d, the above-described pulses are also supplied to the control circuit. The thus supplied pulses switch only;the control terminal a to digital signal "H", causing only the switch S1 to be switched on so that only the signals supplied from the image sensor arrays a and b are, through the terminal OUT0, transmitted to the terminal IN1 of the microprocessor MP through the amplifier G. When the transfer of the signals supplied from the image sensor arrays a and b has been ended and pulses are transmitted from the first control portion 4 to the terminal TR1, the above-described pulses are also supplied to the control circuit. The thus supplied pulses switch only the control terminal B to digital signal "H", causing only the switch S2 to be switched on so that only the signal supplied from the image sensor array c is, through the terminal OUT1, transmitted to the terminal IN1 of the microprocessor MP through the variable-gain amplifier G. When the transfer of the signal supplied from the image sensor array c has been ended and pulses are transmitted from the first control portion 4 to the terminal TR2, the above-described pulses are also supplied to the control circuit. The thus supplied pulses switch only the control terminal Y to digital signal "H", causing only the switch S3 to be switched on so that only the signal supplied from the image sensor array d is, through the terminal OUT2, transmitted to the terminal IN1 of the microprocessor MP through the amplifier G.

The microprocessor MP supplies a signal, which causes the image sensor chip 3 to start the storage, to the terminal CLR of the image sensor chip 3, the microprocessor MP as well supplying the clock CLK1 to the transfer gates 111, 112 and 113. The microprocessor MP supplies a signal, which causes the image sensor chip 3 to end the storage, to the terminal TRR of the first control portion, while the microprocessor MP receives data for the image sensor array supplied from the second control portion 5 through the terminal IN1 so as to A/D-convert it by an A/D converter included therein. The microprocessor MP stores the data thus A/D-converted in a memory thereof. As an alternative to the structure arranged as described above in such a manner that the A/D converter is included in the microprocessor MP, the A/D converter may be mounted on the surface of the microprocessor MP. However, it is not preferable to employ that structure since a camera must have a reduced size. The calculations for detecting the focal point are performed by using data columns stored in the memory. Since the method of calculating the focal point has been disclosed in U.S. Pat. No. 4,561,749 by the applicant of the present invention, the description about it is omitted here.

The microprocessor MP receives the voltage V as the light receipt signal of the image formed on the finder screen FS, the voltage V being supplied from the output terminal OUTE of the photometric module AE through the input terminal IN2 so as to A/D-convert and store it in the memory thereof. The Bv value denoting the brightness of the subject is calculated by the APEX method from the voltage V which has been A/D-converted. Now the structure of the photometric module AE arranged as a counter-measure against a light source such as a fluorescent lamp the brightness of which is cyclically changed will be described with reference to FIGS. 8A, 8B and 8C.

Figure 8A:
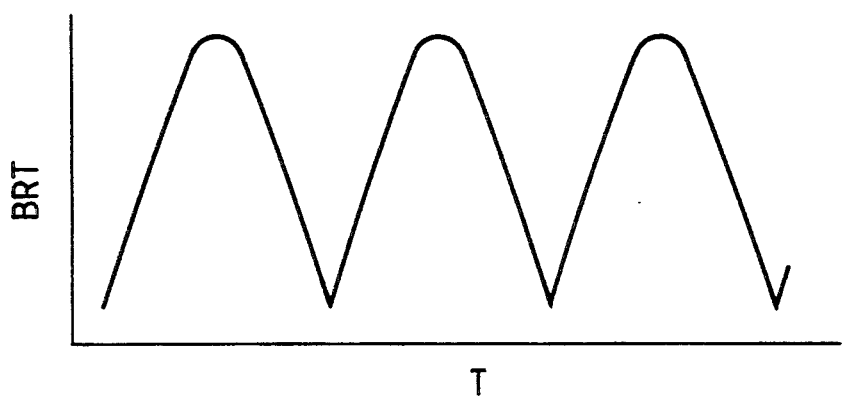
FIGS. 8A, 8B and 8C illustrate signal waveforms of photometric signals when the brightness of a light source is cyclically changed.
Figure 8B:
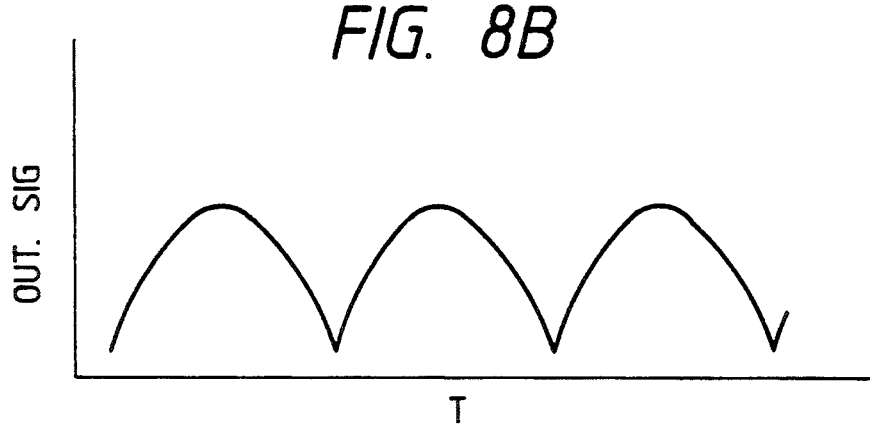
Figure 8C:
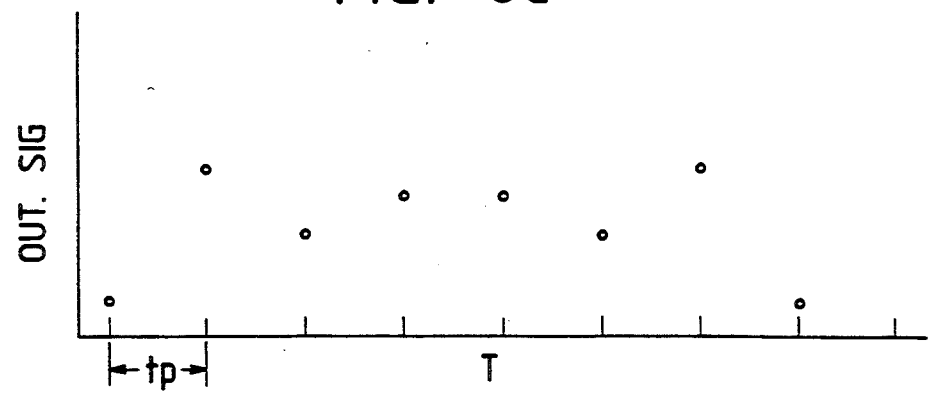
Figure 9:
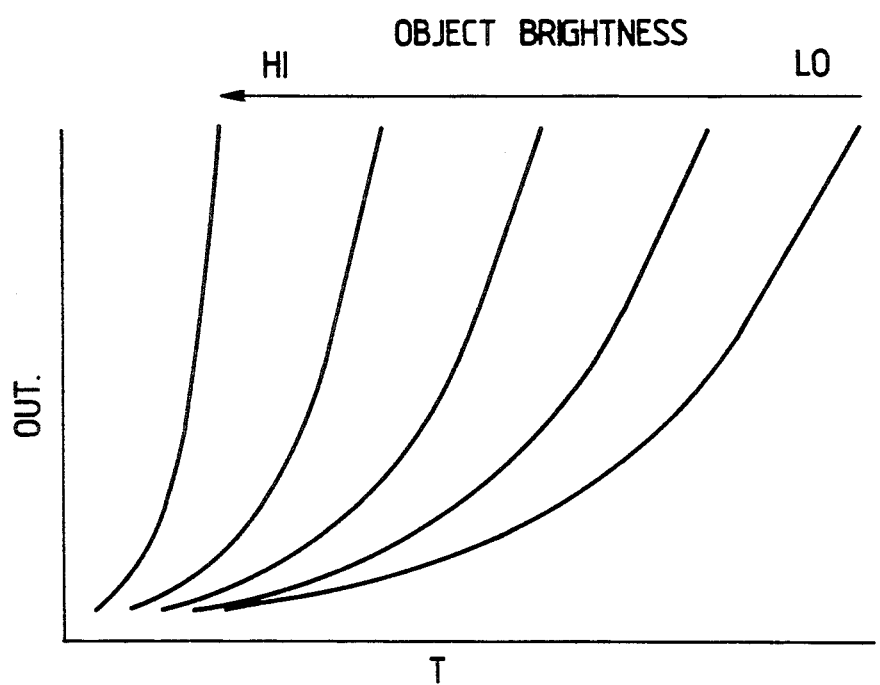
FIG. 9 illustrates the relationship among the storage time of an image sensor, array, the subject brightness and output.

As the light source the brightness of which is cyclically changed, consider a light source the waveform of which is, as shown in FIG. 8A, in the form of an absolute value of a sine wave. The voltage V transmitted from the photometric module AE is changed with time as shown in FIG. 8B which illustrates the waveform of a light source logarithmically compressed.

The microprocessor MP receives the output voltage supplied from the photometric module AF at predetermined cycle tp so as to add the input signals for several times of the inputs and calculate the average of the added input signals. As a result, the Bv value is calculated from the average value which is used as brightness information obtained by a second photometric means. The additions may be performed 8 to 12 times. Since the frequency of a light source depends upon the frequency of an AC power source, the detection cycle tp is determined.

A method of obtaining brightness information by using data for the image sensor chip 3 of the focal-point detecting module AF will now be described.

The output from a storage type image sensor such as a CCD depends upon the brightness of a subject and the storage time. For example, when the storage time is lengthened by twice in the case where the brightness of a subject is the same, the output becomes twice as great. When the brightness of the subject is increased by twice in the case where the storage time is the same, the output becomes twice as great. Therefore, the output from the image sensor cannot be used as brightness information as it is. Therefore, the following standardization in terms of the storage time must be performed:

OUT/IT where symbol OUT represents the output from the image sensor and IT represents the storage time.

The standardized value is then subjected to the logarithmic processing so that the value Bv denoting the subject brightness in the APEX method is calculated.

Figure 10A:
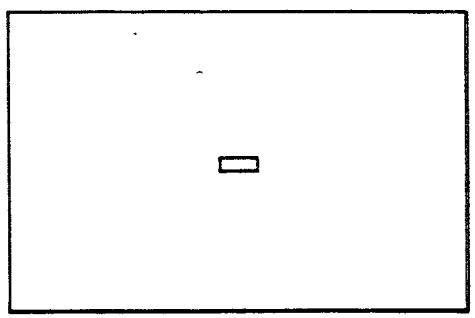
FIGS. 10A and 10B illustrate the region in which the image sensor array performs the photometry in a photographed frame.
Figure 10B:
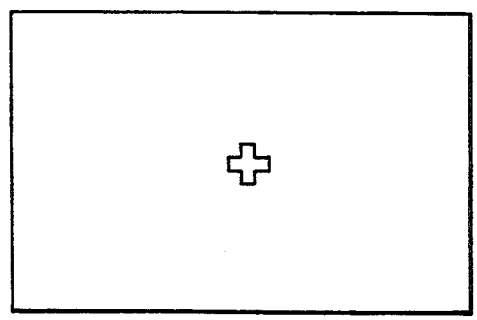

The outputs from the pixels of the image sensor arrays forming one column are, as shown in FIG. 11, different from one another. Therefore, as the output OUT from the image sensor, the average of the outputs from all of the pixels, the average of the outputs from a portion of all of the pixels, the output the level of which is the highest, or the output the level of which is the lowest may be employed. The image sensor chip 3 according to the present invention is arranged in such a manner that image sensor arrays are arranged in the longitudinal direction and the lateral direction. It is preferable that the outputs from the pixels in the central portions of the above-described image sensor arrays in the two directions be used so as to determine the image sensor output OUT. In this case, an advantage can be obtained in that the difference in the result of the photometry between the vertical photography and the lateral photography can be eliminated since the spot photometry region becomes cross-shaped as shown in FIG. 10B in comparison to the case as shown in FIG. 10A in which the spot photometry region becomes elongated when either of the image sensor arrays is used.

Figure 12A:
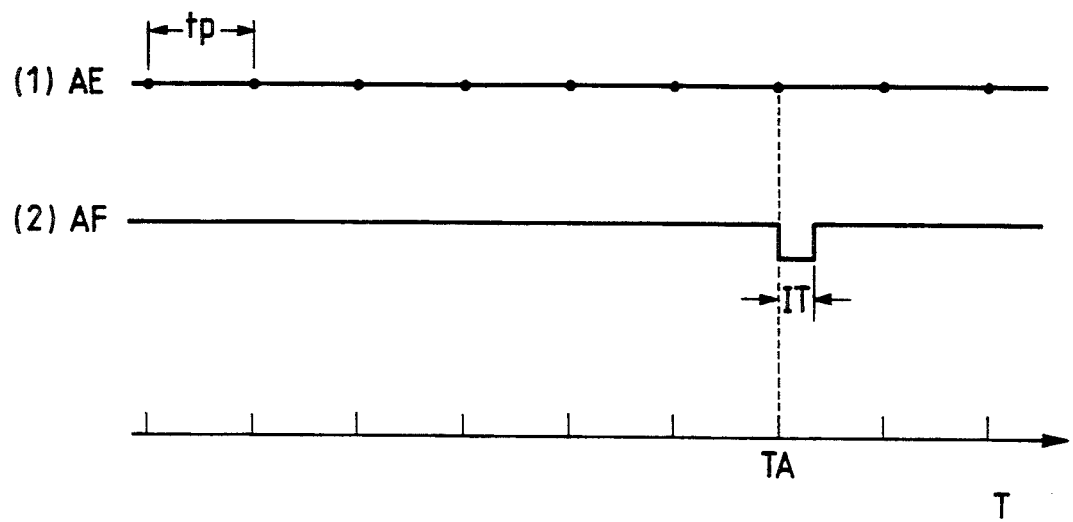
FIGS. 12A and 12B illustrate the timing of an output from the photometric module AE and an output from the focal-point detecting module AF.
Figure 12B:
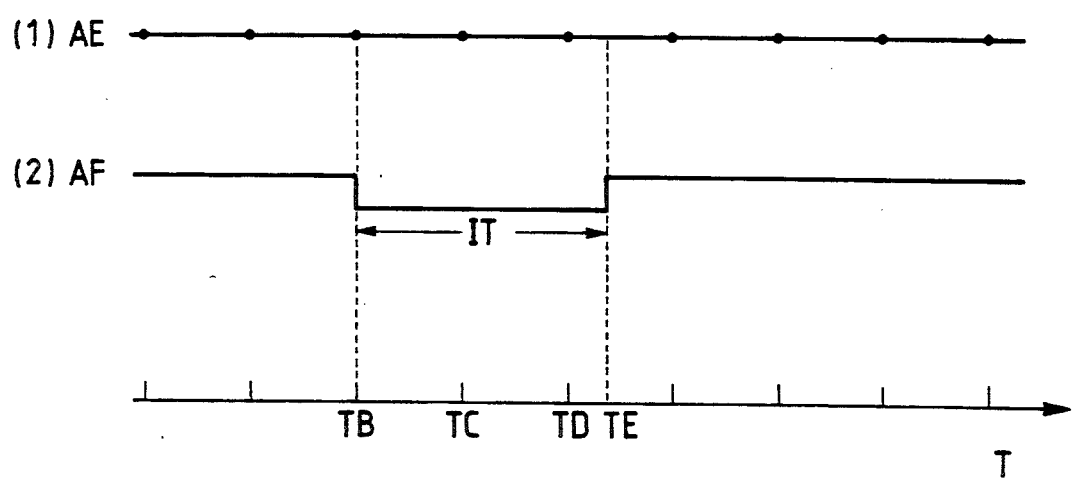

With reference to FIGS. 12A, 12B and 13, a structure will be described in which the spot photometry is performed by using the output from the image sensor of the focal-point detecting module AF and which is arranged as the countermeasure against a light source such as a fluorescent the brightness of which is cyclically changed.

Referring to FIGS. 12A and 12B, (1) represents the timing at which microprocessor MP receives signals from the photometric module AE at the predetermined cycle tp and (2) represents the timing of the input signal to the terminal CLR of the image sensor array of the focal-point detecting module AF.

FIG. 12A shows a case in which the brightness of a subject is high and image sensor array storage time IT is short as follows:

$$IT < tp.$$

First, the storage of the image sensor array is started simultaneously with the receiving of the signal from the photometry module at time TA. Actually, the storage is started immediately after the receiving of the signal from the first photometric module, but it takes almost no time to receive the signal from the first photometric module. Therefore, it can be considered that the above-described two operations are performed simultaneously. After a lapse of time IT, the storage is ended. A standardized value (OUT/IT) is calculated from the output from the image sensor array obtained from the above-described storage. Then, brightness value Ez is obtained by calculating the value Bv. It is assumed that the value Bv calculated from data supplied from the photometric module AE at time TA is Ha shown in FIG. 13 and the value Bv calculated from the average value of the past 8 times including the data used for calculating Ha is Hm designated by a dotted line. Although the photometric region of the photometric module AE and the photometric region of the focal-point detecting module AF are different from each other, it can be considered that the same illumination light source is used. Furthermore, it can be considered that value Ha of Bv calculated from data supplied from the photometric module AE and value Ez of Bv calculated from data supplied from the focal-point detecting module AF are the subject brightness at substantially the same time. Therefore, it can be expected that the difference (Em−Ez) between the value Em and Ez of Bv calculated from the averaging of data obtainable from performing the storage in the image sensor array several times is subtantially the same as the difference (Hm−Ha) between Hm and Ha which are the value Bv obtained from data of the photometric module AE.

Therefore, Em calculated by the following equation is used as the result of the photometry of the focal-point detecting module AF which is not influenced a cyclic light source:

$$Em = Ez + Hm - Ha \tag{1}$$

As described above, according to the present invention, only one storage is conducted in the image sensor array. Therefore, a significantly quick photometry can be realized in comparison to a case in which a plurality of storages are performed.

FIG. 12B shows a case in which the brightness of the subject is lowered and the storage time IT in the image sensor array is lengthened as follows:

$$tp < IT < 3 \times tp \tag{2}$$

The storage in the image sensor array is started at time tp simultaneously with the receipt of the signal from the photometric module AE. The storage is ended after a lapse of time IT. The standardized value (OUT/IT) is calculated from the output from the image sensor array obtained from the above-described storage. Then, Ez is calculated as the value Bv.

The values of Bv calculated from data supplied from the photometric module AE at times TB, TC and TD during IT are Hb, Hc and Hd shown in FIG. 13. Thus, Hm (dotted line) is, as the value Bv, obtained from the average value of data for the past 8 times including data used for calculating values Hb, Hc and Hd.

calculated from data supplied from the image sensor array can be considered to be the average value of the subject brightness during the time period from time TB to time TE. Therefore, it is expected that the difference (Em−Ez) between the value Em and Ez of the Bv value obtained by averaging data obtained from a plurality of storages in the image sensor array is substantially the same as the difference between Hm and the average value of Hb, Hc and Hd: {Hm−(Hb+Hc+Hd)/3}. Therefore, Em which can be obtained from the following equation is used as the Bv value for the focal-point detecting module AF which is not influenced by the cyclic light source.

$$Em = Ez + Hm - (Hb + Hc + Hd)/3 \tag{3}$$

Furthermore, in the case where the brightness of a subject has been lowered and the storage time is lengthened, the value Em of the Bv value may be obtained similarly to the above-described case. Since the image sensor array transmits the average value of the brightness of the subject during only the storage time, value Ez of the Bv value obtainable at this time may be as it is used as the result of the photometry of the focal-point detecting module AF.

According to the above-described embodiment, the first photometric module AE is positioned in the vicinity of the ocular for the purpose of transmitting brightness information for the image on the focusing screen FS. The present invention is not limited to the above-described structure. Now a modification to the photometric module will be described.

Figure 14:
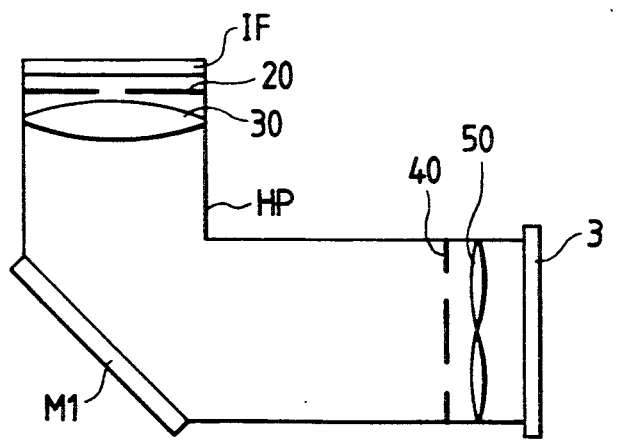
FIG. 14 illustrates an example of a structure for supporting the focal-point detecting optical system.

An example of a method of supporting the focal-point detecting module shown in FIG. 3 is shown in FIG. 14.

Figure 15:
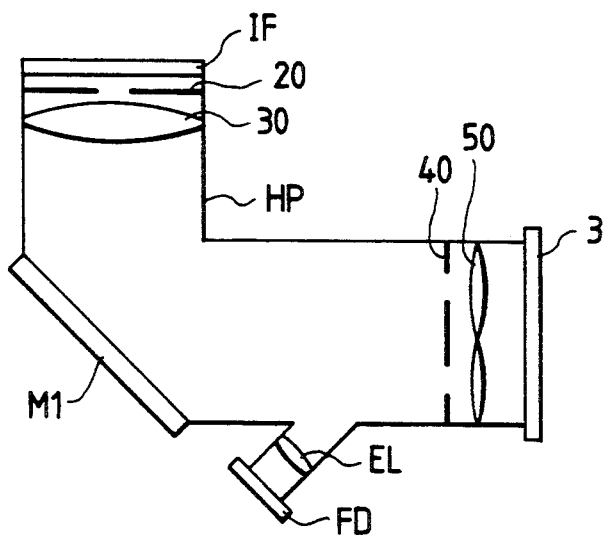
FIGS. 15 to 17 illustrate the structure of an embodiment in which the first photometric device is positioned in the vicinity of the focal-point detecting module.

Referring to FIG. 15, symbol HP represents a holder made of plastic, reference numeral 3 represents the image sensor array, 50 represents a re-imaging lens, 40 represents a diaphragm, 30 represents a field lens, 20 represents an eye field mask, M1 represents a mirror and IF represents an infrared ray cut filter.

The infrared ray cut filter IF protects the image sensor array 3 by cutting infrared ray components which affect the focal detection effect. The mirror M1 acts to bend the beams so as to enable the overall body of the optical system to be included in the camera.

Figure 16:
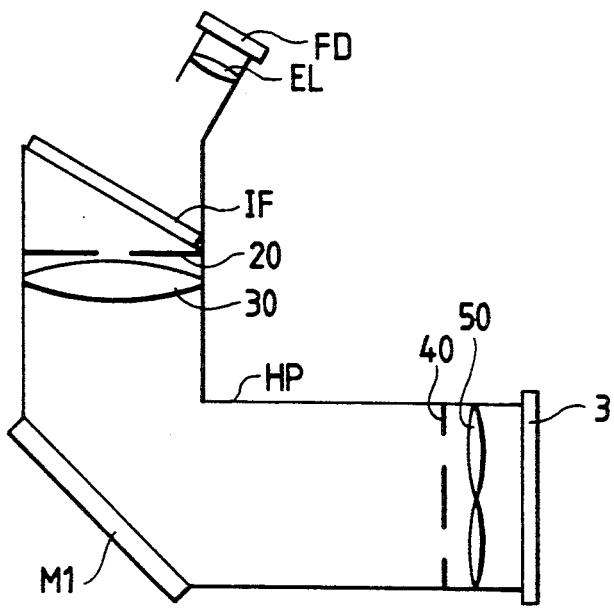
Figure 17:
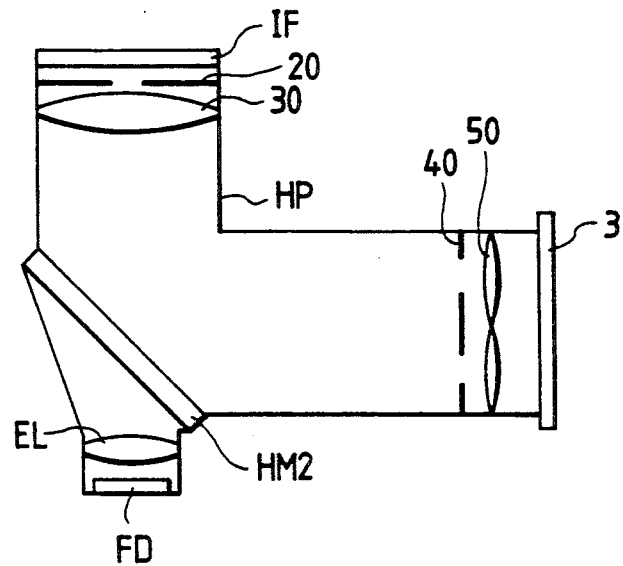

FIGS. 15 to 17 show embodiments arranged in such a manner that the first photometric module AE is disposed in the vicinity of the thus constituted focal-point detecting module AF.

FIG. 15 illustrates an embodiment arranged in such a manner that the lens EL of the first photometric module and the photodiode FD are positioned in the bottom portion of the holder HP of the focal-point detecting module so as to receive beams reflected by the diaphragm 40 and the re-imaging lens 50.

FIG. 16 illustrates an embodiment arranged in such a manner that the infrared ray cut filter IF is disposed inclined so that the lens EL and the photodiode FD receive the beams reflected by the infrared ray cut filter IF.

According to an embodiment shown in FIG. 17, a half mirror HM2 is disposed as an alternative to the mirror M1 shown in FIG. 14 so that the lens EL and the photodiode FD receive the beams which have passed through the half mirror HM2.

If the quantity of the reflected light and the transmitted light according to the embodiments shown in FIGS. 15 and 17, is insufficient the reliability of the output from the first photometric module is insufficient in the case where the brightness of the subject is at a low level. However, in the case where the brightness of the subject is at a low level, the storage time in the image sensor array becomes lengthened. Therefore, the brightness of the subject can be detected while eliminating a necessity of correcting the output from the image sensor array even if the brightness of the light source is changed in an AC manner such as a fluorescent lamp. In the case where the subject brightness is at a high level and the quantity of the above-described reflected light is sufficient, the reliability of the output from the first photometric module becomes satisfactory. Therefore, even if the brightness of the light source is changed in an AC manner, photometry can be performed by correcting the output from the image sensor array in accordance with the output from the first photometric module.

As described above, the structure is arranged in such a manner that the first photometric module is positioned in the vicinity of the focal-point detecting module as an alterhative to the structure arranged in such a manner that the first photometric module acts to obtain the brightness information for the image on the focusing screen. As a result, an advantage can be obtained in that, in a case where a finder having no photometric means is mounted on a lens interchangeable camera, brightness information for the subject can be obtained by the image sensor array of the focal-point detecting module and the first photometric means.

As described above, according to the present invention, photometric information can be quickly obtained in a photometric apparatus in which the output from a storage type image sensor for detecting the focal point is used as the brightness information for the subject even if the subject is illuminated by a light source such as a fluorescent.

According to the above-described embodiments of the present invention, the charge storage type image sensor is used for detecting the focal point and is also used to obtain the brightness information for a subject. The present invention is not limited to the above-made description. The present invention may be applied in a major portion of the cases in which the storage type image sensor is intended to be used without the influence from a light source the brightness of which is changed in an AC manner. For example, it may be applied to so-called multi-pattern photometry for a camera in which the photographic frame is sectioned into a plurality of regions and the brightness of each of the regions is detected so that exposure information concerned with the most suitable exposure to the photographic film is obtained from the brightness distribution of the photographic frame. Now an embodiment of that structure will be described.

Figure 18:
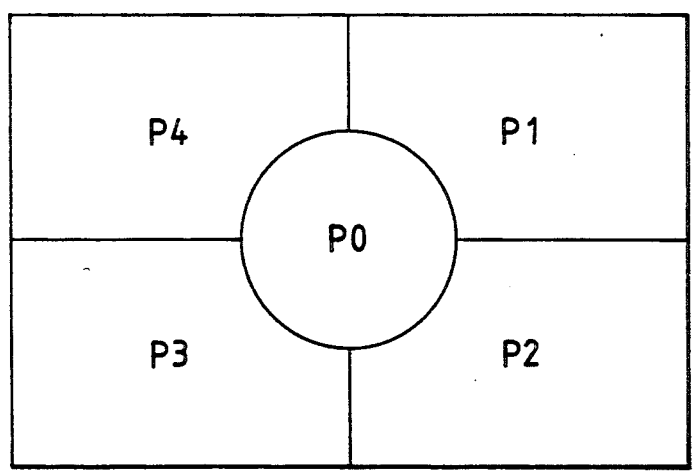
FIG. 18 is a front elevational view which illustrates a photometric sensor which has been sectioned into five pieces.

The multi-pattern photometry has been disclosed in, for example, U.S. Pat. No. 4,476,383. For example, the structure is, as shown in FIG. 18, arranged in such a manner that the photometric sensor corresponding to the photographed frame is constituted by five brightness information of the photographed frame is detected in accordance with the output from of the five photosensors, P0, P1, P2, P3 and P4. Although the number of the sections formed by dividing the photographic frame is arranged to be five according to this embodiment further accurate exposure information can be obtained by increasing the number of the sections formed by the above-described division since the brightness information for the photographed frame can be finely detected. However, if the number of the sections is increased, the area for one photo-sensor becomes reduced. When the area of the photo-sensor becomes reduced, the output current for unit brightness is concurrently reduced. Therefore, a problem arises in that accurate exposure information cannot be obtained in the case where the brightness level is low. Therefore, a storage type 2-D image sensor which stores the charge generated by a photosensor, for example a 2-D CCD image sensor must be employed. In this case, another problem arises in the case where the subject is illuminated by a light source the brightness of which is changed in an AC manner similarly to the case where the spot photometry is performed by using the output from the focal-point detecting CCD image sensor.

Figure 19:
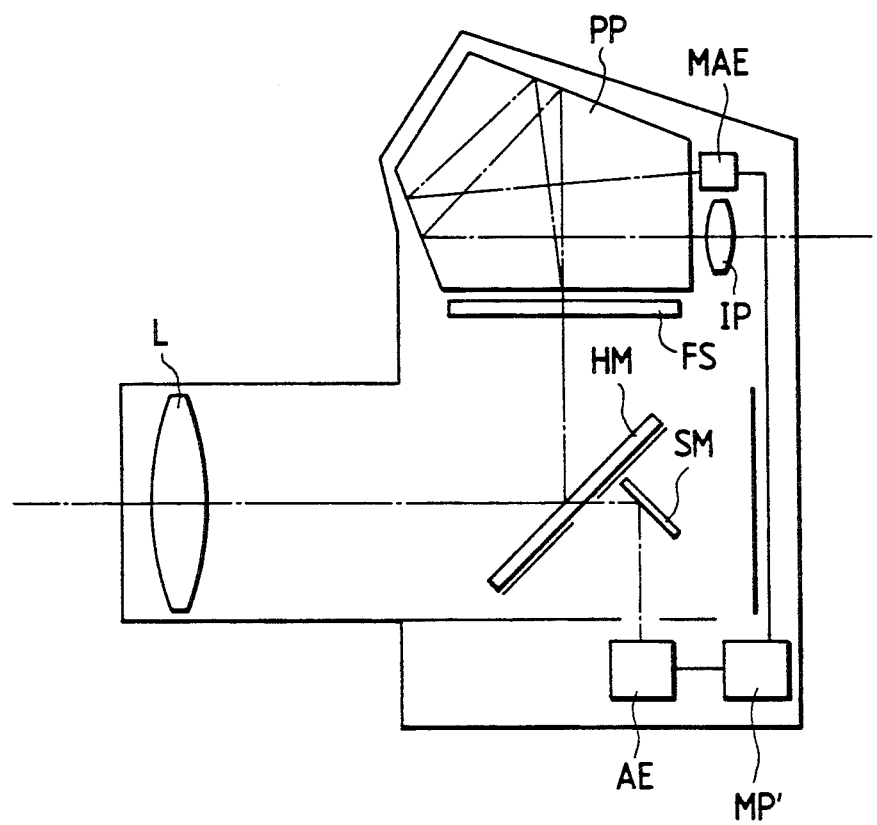
FIG. 19 is an overall view which illustrates the camera to which another embodiment is applied.

FIG. 19 illustrates the structure of a case in which this embodiment is applied to a single-lens reflex camera. Referring to the drawing, symbol L represents an objective lens, HM represents a half mirror, SM represents a sub-mirror, FS represents a focusing screen, PP represents a penta brism, IP represents an ocular, AE represents a f photometric portion, MAE represents a multi-pattern photometric portion including a 2-D CCD image sensor to be described later and MP' represents a microprocessor. Beams are passed through the objective lens L, and then a portion of them is reflected by the half mirror HM so as to be imaged on the focusing screen FS. Therefore, the photographer can observe the thus formed image through the ocular IP in the form of an image erected by the penta prism PP. The multi-pattern photometric portion MAE transmits the brightness information for each of the sectioned regions of the image on the focusing screen FS to the microprocessor MP'. The beams which have passed through the half mirror HM and which are positioned near the optical axis of the objective lens L are introduced into the first photometric portion AE by the sub-mirror SM. The first photometric portion AE may be arranged as shown in FIG. 4 or may be in the form as shown in FIGS. 15, 16 and 17 in which it is added to the focal-point detecting module. Furthermore, the position at which the first photometric portion AE is placed is not limited to the bottom portion the body as shown in FIG. 19.

Figure 20:
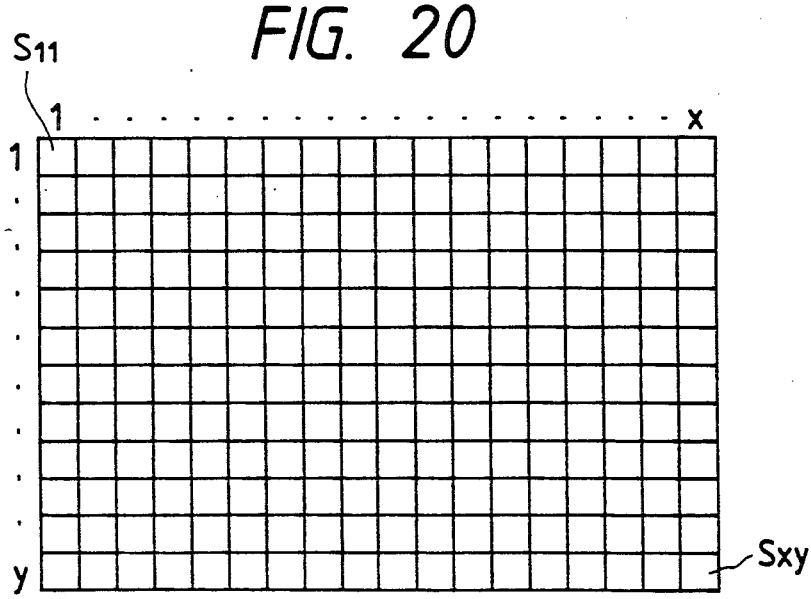
FIG. 20 is a front elevational view which illustrates a 2-D CCD image sensor.

The 2-D CCD image sensor for use in the multi-pattern photometric portion MAE is, as shown in FIG. 20, constituted by $(x \times y)$ pieces of sensors (S11 to Sxy), the 2-D CCD image sensor having a transferring portion (not shown) for transferring the charge generated in each of the pixels and stored therein The charge signal generated in each of the pixels during a certain storage time is time-sequentially transmitted by the transferring portion.

The microprocessor MP' receives s signal from each of the first photometric portion AE and the multi-photometric portion MAE so as to calculate brightness information and exposure information concerned with the suitable exposure for the film.

Now the structure will be described which is arranged to perform the photometry by using the output from the 2-D CCD image sensor of the multiphotometric portion MAE and which is cobstituted as the countermeasure against a light source such as a fluorescent lamp the brightness of which is changed in an AC manner.

The above-described (1) shown in FIGS. 12A and 12B corresponds to the timing at which the microprocessor MP' receives a signal from the first photometric portion AE, while (2) corresponds to the storage time and the timing for the 2-D CCD image sensor of the multi-photometric portion MAE. In the case where the brightness of the subject is high and the storage time IT is short IT<tp as shown in FIG. 12A the storage in the 2-D CCD image sensor is started at time TA substantially simultaneously with the receipt of a signal from the first photometric portion AE. The storage is ended after a lapse of time IT. As a result of the above-described storage, (OUT11/IT to OUTxY/IT) is calculated from the output OUT11 to OUTxy) of (S11 to Sxy) obtained from the 2-D CCD image sensor. It is assumed that the value of Bv calculated form the above-described (OUT11/IT to OUTxy/IT) becomes (Ez11 to Ezxy). The the value Bv calculated from data supplied from the first photometric portion AE at time TA corresponds to Ha shown in FIG. 13. Furthermore, the value Bv calculated by averaging the above-described data for 8 times to Hm designated by a dotted line. Although the photometric region of the first photometric portion AE and that of the multiphotometric portion MAE are different from each other, it is considered that the same illuminatin light source is used. Furthermore, it can be considered that Ha and (Ez11 to Ezxy) are the subject brightness at substantially the same time. Therefore, it can be expected that the difference between the value Bv (Em11 to Emxy) and (Ez11 to Ezxy) obtained by averaging data obtained by performing thestorages in the image sensor arrays by a plurality of times is substantially the same as the above-described difference between Hm and Ha. Therefore, Emmn calculated form the following equation used as the result of the photometry for the region of the photographed frame to which each of the pixe of the 2-D CCD image sensor of the multi-photometric portion corresponds:

$Emmn = Ezmn + Hm - Ha$ $(m=1, \ldots, x, n=1, \ldots, y)$

Since the storage of the 2-D CCD image sensor is restricted to once, the photometry can be significantly quickly performed in comparison to the case in which the storages are performed by a plurality of times.

FIG. 12B illustrates a case in in which the brightness of the subject is low and the storage time IT in the 2-D CCD image sensor is long: $tp < IT < 3 \times tp$. The storage in the 2-D CCD image sensor is started simultaneously with the receipt of a signal from the first photometric portion AE at time TB. The storage is ended after a lapse of time IT. It is assumed that (OUT11/IT to OUTxy/IT) is calculated from output (OUT11 to OUTxy) of (S11 to Sxy) obtained from the 2-D CCD image sensor as a result of the above-described storage and the Bv value calculated from (OUT11/IT to OUTxy/IT) becomes (Ez11 to Ezxy). The Bv value calculated from data supplied from the first photometric portion AE at time TB, TC and TD during IT becomes Hb, Hc and Hd (FIG. 13). As a result, the value Hm of the Bv value can be obtained by averaging data for 8 times including the above-described data. Since it can be considered that the above-described (Ez11 to Ezxy) is the average value of the subject brightness during the time period from time TB to time TE, it can be expected that the difference between the Bv value (Em11 to Emxy) and (Ez11 to Ezxy) obtained by averaging data obtained by performing the storage in the 2-D CCD image sensor by a plurality of times is substantially the same as the difference between the above-described Hm and Hb, Hc and Hd. Therefore, Emmn calculated by the following equation is used as the result of the photometry for the regions of the photographed frame to which each of the pixels of the 2-D CCD image sensor of the multi-photometric portion corresponds:

$Emmn = Ezmn + Hm - (Hb30\ Hc + Hd)/3$ $(m=1, \ldots x, n=1, \ldots, y)$.

Even if the brightness of the subject is low and the storage time is lengthened, Emmn may be obtained in a manner similarly to the above-described case The 2-D CCD image sensor transmits the average value of the brightness of a subject during the storage time. Therefore, if the storage time is considerably long, the value Ezmn of the Bv value calculated at this time can be as it is used as the result of the photometry of the regions of the photographed frame to which each of the pixels of the 2-D CCD image sensor of the multi-photometric portion corresponds.

Although the invention has been described in its preferred form with a certain degree of particularly it is understood that the present disclosure of the preferred form may be changed in the details of construction and the combination and arrangement of parts may be varied without departing from the spirit and the scope of the invention as hereinafter claimed.

What is claimed is:

1. A photometric apparatus for use in a camera having a photoelectric conversion device and a storage type image sensor, comprising:

first determining means for receiving a photoelectric conversion signal from said photoelectric conversion device and determining photoelectric conversion brightness information in response to said photoelectric conversion signal;

second determining means for receiving said photoelectric conversion signal from said photoelectric convesion device a plurality of times and determining averaged photoelectric conversion brightness information in accordance with the averaged value of said photoelectric conversion signal received a plurality of times;

third determining means for receiving an image sensor signal from said image sensor in response to the completion of a storage operation by said iamge sensor and determining image sensor brightness information in response to said image sensor signal; and correction means for correcting said image sensor brightness information in accordance with said photoelectric conversion brightness information and said averaged photoelectric conversion brightness information so as to make said image sensor brightness information correspond to the average value of image sensor brightness information obtained by said image sensor performing a storage operation said plurality of times.

2. A photometric apparatus according to claim 1, wherein said correction means performs correction in such a manner that the difference between said averaged photoelectric conversion brightness information determined by said second determining means and said brightness information determined by said first determining means at substantially the same time at which one storage operation of said image sensor is ended, is added to said iamge sensor brightness information determined by said third determining means in the case where the time in which the storage in said image sensor is shorter than a cycle of operation of said first determining means.

3. A photometric apparatus according to claim 1, wherein said correction means performs correction in such a manner that the difference between said averaged photoelectric conversion brightness information determined by said second determining means and the averge value of said photoelectric brightness information which has been determined by said first determining means during one storage operation by said image sensor is added to said image sensor brightness information determined by said third determining means in the case where the time in which the storage in said image sensor is longer than a cycle of operation of said first determining means.

4. A photometric apparatus according to claim 1, wherein said image sensor consists of two groups of image sensor arrays which are positioned on the same straight line.

5. A photometric apparatus according to claim 1, wherein said image sensor consists of two groups of image sensor arrays which are positioned perpendicularly to each other.

6. A photometric apparatus according to claim 1 further comprising a re-imaging lens arranged in such a manner that light transmitted by said re-imaging lens is made incident upon said image sensor and light reflected by said re-imaging lens is made incident upon said photoelectric conversion device.

7. A photometric apparatus according to claim 1 further comprising a infrared-ray cut filter arranged in such a manner that light transmitted by said infrared-ray cut filter is made incident upon said image sensor and light reflected by said infrared-ray cut filter is made incident upon said photoelectric conversion device.

8. A photometric apparatus according to claim 1 further comprising a half mirror arranged in such a manner that light transmitted by said half mirror is made incident upon said photoelectric conversion device and light reflected by said half mirror is made incident upon said image sensor.

9. A photometric apparatus for use in a camera having a photoelectric conversion device and a storage type image sensor, comprising:

first determining means for receiving a photoelectric conversion signal from said photoelectric conversion device and determining photoelectric conversion brightness information in response to said photoelectric conversion signal;

second determining means for receiving said photoelectric conversion signal from said photoelectric convesion device a plurality of times and determining averaged photoelectric conversion brightness information in accordance with the averaged value of said photoelectric conversion signal received a plurality of times;

third determining means for receiving an image sensor signal from said image sensor in response to the completion of a storage operation by said iamge sensor and determining image sensor brightness information in response to said image sensor signal; and correction means for correcting said image sensor brightness information in accordance with said photoelectric conversion brightness information and said averaged photoelectric conversion brightness information.

10. A photometric apparatus according to claim 9, wherein said correction means performs correction in such a manner that the difference, between said averaged photoelectric conversion brightness information determined by said second determining means and said brightness information determined by said first determining means at substantially the same time at which one storage operation of said image sensor is ended, is added to said image sensor brightness information determined by said third determining means in the case where the time in which the storage in said image sensor is shorter than a cycle of operation of said first determining means.

11. A photometric apparatus according to claim 9, wherein said correction means performs correction in such a manner that the difference between said averaged photoelectric conversion brightness information determined by said second determining means and the averge value of said photoelectric brightness information which has been determined by said first determining means during one storage operation by said image sensor is added to said image sensor brightness information determined by said third determining means in the case where the time in which the storage in said image sensor is longer than a cycle of operation of said first determining means.

12. A photometric apparatus according to claim 9, wherein said image sensor is 2-D CCD image sensor.

13. An apparatus having a photoelectric conversion device and a storage type image sensor comprising:

first determining means for receiving a photoelectric conversion signal from said photoelectric conversion device and determining photoelectric conversion brightness information in response to said photoelectric conversion signal;

second determining means for receiving said photoelectric conversion signal from said photoelectric convesion device a plurality of times and determining averaged photoelectric conversion brightness information in accordance with the averaged value of said photoelectric conversion signal received a plurality of times;

third determining means for receiving an image sensor signal from said image sensor in response to the completion of a storage operation by said iamge sensor and determining image sensor brightness information in response to said image sensor signal; and correction means for correcting said image sensor brightness information in accordance with said photoelectric conversion brightness information and said averaged photoelectric conversion brightness information so as to make said image sensor brightness information correspond to the average value of image sensor brightness information obtained by performing said storage operation in said image sensor said plurality of times.

* * * * *